US008574072B2

(12) United States Patent
Motyl et al.

(10) Patent No.: US 8,574,072 B2
(45) Date of Patent: Nov. 5, 2013

(54) VISUALLY PRESENTING WAGERING GAME OPTIONS

(75) Inventors: James E. Motyl, Chicago, IL (US); Scott H. Schulhof, Chicago, IL (US); Richard T. Schwartz, Chicago, IL (US); Matthew J. Ward, Northbrook, IL (US)

(73) Assignee: WMS Gaming, Inc., Waukegan, IL (US)

( * ) Notice: Subject to any disclaimer, the term of this patent is extended or adjusted under 35 U.S.C. 154(b) by 414 days.

(21) Appl. No.: 12/865,502

(22) PCT Filed: Jan. 30, 2009

(86) PCT No.: PCT/US2009/032653

§ 371 (c)(1), (2), (4) Date: Jul. 30, 2010

(87) PCT Pub. No.: WO2009/097538

PCT Pub. Date: Aug. 6, 2009

(65) Prior Publication Data

US 2010/0323785 A1 Dec. 23, 2010

Related U.S. Application Data

(60) Provisional application No. 61/025,459, filed on Feb. 1, 2008.

(51) Int. Cl.
*A63F 13/00* (2006.01)
*G06F 3/048* (2013.01)

(52) U.S. Cl.
USPC ................ 463/31; 463/29; 715/769; 715/853

(58) Field of Classification Search
USPC ........ 463/25, 42, 16–20, 29, 30–34; 715/769, 715/700, 810, 835, 843, 845, 853
See application file for complete search history.

(56) References Cited

U.S. PATENT DOCUMENTS 5,659,790 A * 8/1997 Kim et al. ..................... 715/202
5,971,271 A 10/1999 Wynn et al.

(Continued)

FOREIGN PATENT DOCUMENTS

WO WO-2007098035 8/2007
WO WO-2009097538 8/2009

OTHER PUBLICATIONS

"About the Brain Visual Knowledge Networks for People", *THEBRIAN Visual Information Management* www.thebrain.com (Jan. 29, 2008).

(Continued)

*Primary Examiner* — Damon Pierce
(74) *Attorney, Agent, or Firm* — DeLizio Gilliam, PLLC

(57) ABSTRACT

In some embodiments, a wagering game server includes an options visualization controller configured to receive search criteria and filter information for searching wagering titles, wherein the search is based on the search criteria and filter information. The server may include a game content unit configured to store the wagering game titles. The wagering game system can also include a wagering game machine configured to present the one or more wagering games in a visual map, the visual map comprising nodes that contain summary information associated with the wagering game titles, wherein the nodes are arranged in node groups, and wherein the node groups are graphically connected by graphical connectors. The wagering game machine can present a movable filter object configured to visually depict a filter criteria, wherein the movable filter object is movable onto one or more of the nodes to provide the filtering information to the wagering game server.

6 Claims, 10 Drawing Sheets

(56) References Cited

U.S. PATENT DOCUMENTS

| | | | | |
|---|---|---|---|---|
| 6,139,433 | A | 10/2000 | Miyamoto et al. | |
| 6,404,446 | B1 | 6/2002 | Bates et al. | |
| 2004/0162144 | A1 | 8/2004 | Loose et al. | |
| 2005/0261062 | A1 | 11/2005 | Lewin et al. | |
| 2006/0252530 | A1 * | 11/2006 | Oberberger et al. | 463/29 |
| 2008/0020845 | A1 | 1/2008 | Low et al. | |

OTHER PUBLICATIONS

"PCT Application No. PCT/US09/32653 International Preliminary Report on Patentability", Feb. 3, 2010 , 14 pages.

"PCT Application No. PCT/US09/32653 International Search Report", Mar. 13, 2009 , 9 pages.

"AU Application No. 2009209001 Examination Report", May 3, 2013 , 3 pages.

* cited by examiner

VISUALLY PRESENTING WAGERING GAME OPTIONS

RELATED APPLICATIONS

This application claims the priority benefit of U.S. Provisional Application Ser. No. 61/025,459 filed Feb. 1, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

BACKGROUND

1. Technical Field

Embodiments of the inventive subject matter relate generally to wagering game systems, and more particularly to devices and processes that determine and present wagering game options of wagering game systems and networks.

2. Background Art

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises receiving one or more search criteria to search for wagering games on a wagering game network; determining one or more wagering games to present by processing the one or more search criteria; and presenting the one or more wagering games in a visual map, the visual map comprising one or more nodes that contain summary information about the wagering games, wherein the one or more nodes are arranged within the visual map as interconnecting, hierarchical groupings.

In some embodiments, the one or more nodes comprise one or more sub-nodes that extend radially from a root node, and the method further comprises displaying the summary information on any one or more of the one or more sub-nodes and the root node.

In some embodiments, the one or more nodes are movable within the visual map via player input.

In some embodiments, the one or more nodes are arranged in one or more hierarchical category levels, and the method further comprises presenting the one or more hierarchical category levels such that multiple levels of the category hierarchy are viewable on the visual map at the same time.

In some embodiments, the method further comprises detecting a selection of one of the one or more nodes from the visual map that relates to a selected wagering game; determining a location where the selected wagering game can be accessed; and presenting a map displaying the location of the selected wagering game.

In some embodiments, determining the one or more wagering games comprises accessing one or more preferences in a user account and using the one or more preferences to determine the wagering games to present in the visual map.

In some embodiments, the method further comprises presenting one or more questions regarding preferences; and determining the one or more wagering games using responses to the one or more questions.

In some embodiments, one or more machine-readable media having instructions stored thereon, which when executed by a set of one or more processors causes the set of one or more processors to perform operations that comprise presenting one or more preference questions regarding interests of a wagering game player; receiving responses to the one or more preference questions; determining one or more wagering games to play by processing the responses to the questions; and presenting summary information, in a virtual universe environment, for the one or more wagering games.

In some embodiments, the operations comprise accessing a user account to determine user account preferences; and determining the one or more wagering games using the user account preferences.

In some embodiments, the virtual universe comprises one or more hierarchical information levels representing categories of wagering game information.

In some embodiments, the operations further comprise presenting the summary information on one or more objects within the virtual universe, the objects representing the one or more hierarchical information levels.

In some embodiments, the operations further comprise presenting interactive guidance within the virtual universe environment to guide the wagering game player to the summary information, wherein presenting the interactive guidance further comprises presenting an avatar host to guide the wagering game player through the virtual universe environment.

In some embodiments, the operations further comprise presenting a visual map within the virtual universe environment, the visual map comprising one or more nodes to present the summary information.

In some embodiments, a system comprises a wagering game server comprising an options visualization controller configured to receive one or more search criteria to search for wagering games on a wagering game network, and a game content unit configured to determine one or more wagering games to present by processing the one or more search criteria; and a machine configured to present the one or more wagering games in a visual map, the visual map comprising one or more nodes that contain summary information about the wagering games, wherein the one or more nodes are arranged within the visual map as interconnecting, hierarchical groupings.

In some embodiments, the one or more nodes comprise one or more sub-nodes that extend radially from a root node, wherein the system further comprises an options visualization presenter configured to display the summary information on any one or more of the one or more sub-nodes and the root node.

In some embodiments, the one or more nodes are movable within the visual map.

In some embodiments, the one or more nodes are arranged in one or more hierarchical category levels, and the system further comprises an options visualization presenter configured to present the one or more hierarchical category levels such that multiple levels of the category hierarchy are viewable on the visual map at the same time.

In some embodiments, the system further comprises a wagering game machine configured to detect a selection of one of the one or more nodes from the visual map that relates to a selected wagering game; an options visualization processor configured to determine a location where the selected wagering game can be accessed; and a floor overlay template store configured to present a map displaying the location of the selected wagering game.

In some embodiments, the system further comprises an account server configured to access one or more preferences in an user account; and an account manager configured to use the one or more preferences to determine the one or more wagering games to present in the visual map.

In some embodiments, the system further comprises a query manager configured to present one or more questions regarding preferences; and an options visualization processor configured to determine the one or more wagering games using responses to the plurality of questions.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Figure 1:
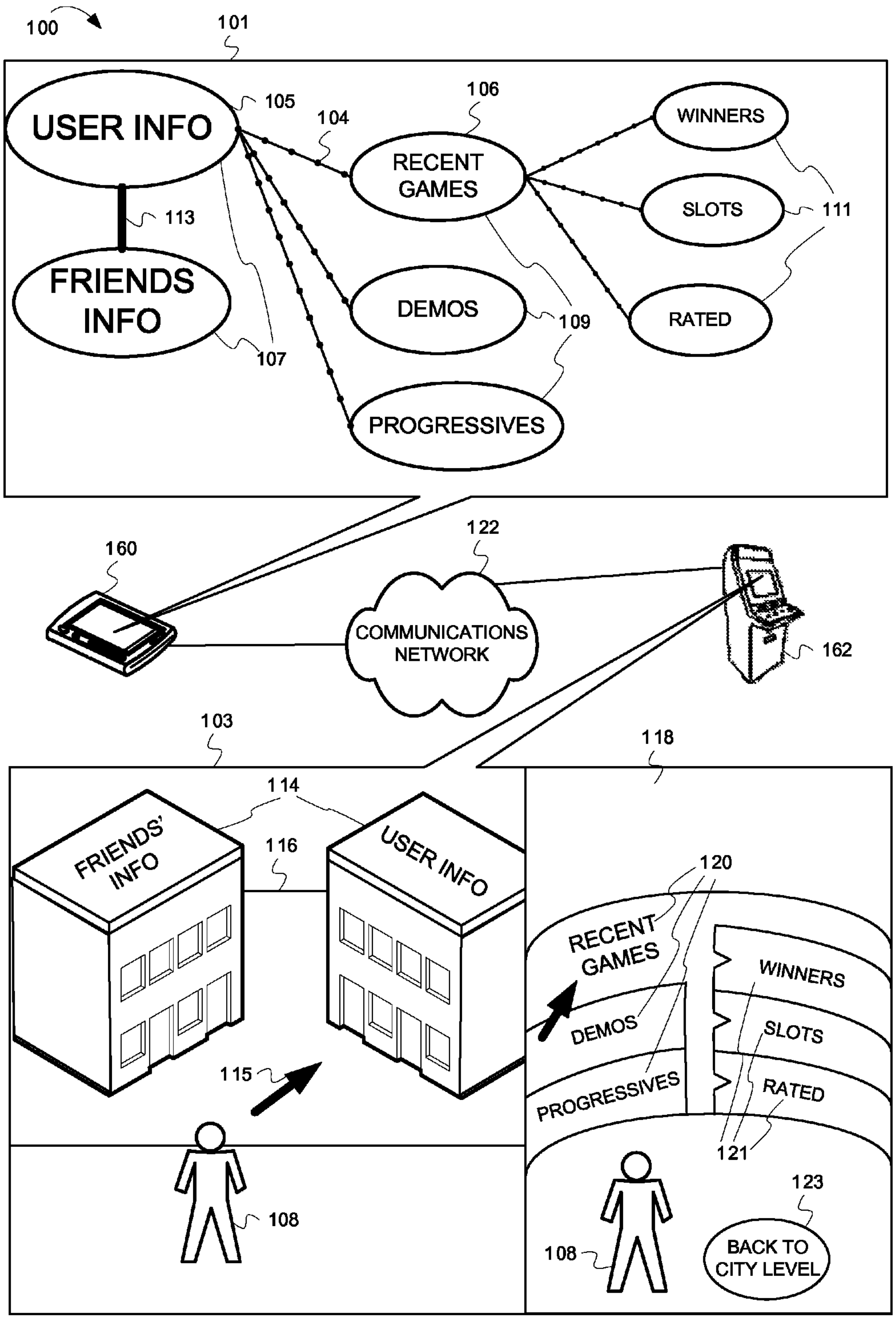
FIG. 1 is an illustration of visually presenting wagering game options, according to some embodiments.

Wagering game players enjoy playing new and exciting wagering games. However, because of the ever growing selection of wagering game options from which to choose, wagering game players may become discouraged trying to choose new games to play. Wagering game options may be so numerous that wagering game players feel lost, and therefore may not try new games. FIG. 1 shows how some devices can work with a wagering game system 100 to present wagering game options in one or more visual selection environments, according to some embodiments.

FIG. 1 is a conceptual diagram that illustrates an example of visually presenting wagering game options, according to some embodiments. In FIG. 1, one or more wagering game machines 160, 162 are connected to a communications network 122. The wagering game machines 160, 162 are configured to process and present wagering games. The wagering game machines 160, 162 present visual wagering game option selection environments ("visual selection environments") 101 and 103, respectively. The visual selection environments 101, 103 utilize visualization techniques that present information, such as summary information about wagering games (e.g., categories, titles, demos, etc.), in a spatially non-linear, dynamic (e.g., interactive, real-time, etc.), and organized (e.g., hierarchical, topical, etc.) manner using visual tools and techniques (diagrams, graphs, flowcharts, cognitive maps, mind maps, semantic networks, virtual worlds, interactive multimedia, animation, etc.) to orient and guide players through potentially numerous and/or complex wagering game options.

The visual selection environment 101 represents a "visual map". A visual map represents ideas, concepts, etc. in a non-linear, hierarchical manner with clusters. The visual map concept can present voluminous information in an asymmetrical, but organized, manner which uses information nodes and connectors to orient a user's mind to complex or large information sets. The visual map may present as much information in the user's view as possible to keep the user oriented to upper and lower level nodes. Further, the visual map can present information in visual groupings or clusters of related information that surround a node in multiple directions (e.g., radially) and/or dimensions (e.g., stacked, three-dimensional, etc.). For example, the visual map in the visual selection environment 101 is configured to display multiple levels of nodes 107, 109, 111. The nodes 107, 109, 111 are hierarchical, such that a first level of nodes 107 represent a first topical level. The first level nodes 107 can be connected by a connector 113, or other mechanism (e.g., node shape, node color, node luminosity, etc.), that conveys the same level. A root node 105 of the first topical level can present a lower level of nodes 109 connected to the root node 105 by connectors. The lower level of nodes 109 present information related to the topic of the root node 105. For example, the lower level nodes 109 all relate to the category of "user information", which defines the topic of the primary root node 105. Similarly, a node 106 from the lower level of nodes 109 connects to another lower level of nodes 111. The lower level nodes 111 relate to the topic of "recent games", which is the topic of the node 106.

The wagering game machine 162 presents a visual selection environment 103. The visual selection environment 103 is a virtual universe, or a three-dimensional (3D) perspective computer environment where characters, like avatar 108, can navigate the virtual universe topology and interact with virtual universe objects 114 (e.g., buildings, items, other avatars, animals, etc.). In FIG. 1, the virtual universe objects 114 are represented as buildings. The building objects 114 accommodate the avatar 108. The building objects 114 present topics belonging to a primary, or root, information level 116. The information level 116 is hierarchical such that the objects 114 of the information level 116 presents a broad category of information (e.g., "user information" or "friend's information"). The avatar 108 can enter a building (e.g., the building that says "user information"), for example, by following an arrow 115 within the visual selection environment 103. When the avatar 108 enters one of the building objects 114, the avatar 108 sees a secondary information level 118, which has sub-topics 120 related to the selected topic (e.g., "user information") of the primary information level 116. The secondary information level 118 can also include sub-topics 121 related to the sub-topics 120. The secondary information level 118, however, could introduce other information levels (not shown), or could introduce other configurations, not shown, that present a hierarchy of information. The other configurations can show information in a visually non-linear, but organized, manner that also orients the user to levels, or groupings of information, much like the visual map presented in the visual selection environment 101. For example, the sub-topics 120, 121 are displayed against a wall of the information level 118. The sub-topics are not organized in a strictly horizontal or vertical manner, but can be positioned using multiple directions and dimensions. The positioning of the sub-topics 120, 121 follows an interesting and easily recognizable pattern or scheme (e.g., first level information 116 follow an outdoors topology scheme, second level information 118 follows a wall decoration scheme, etc.) in the virtual universe, thus allowing a wagering game player to visually process information quickly. Further, the secondary information level 118 also contains a visual presentation of an upper level of information (e.g., button 123), which helps to visually orient a gaming player to where the player currently is within the visual selection environment 103.

According to some embodiments, the wagering game system 100 can include numerous different wagering game options or wagering game related information. The following non-exhaustive list enumerates some of the possible game options that the wagering game system 100 can present via the visual selection environments 101, 103, via nodes, information levels, etc.

- User Ratings.
- Age of a Game (e.g., date created, date first played).
- Most played games.
- Branding attributes (e.g., incorporate third party products).
- Game volatility (i.e., what does a player win and when).
- Related game themes.
- Related game features.
- Cascading games.
- Can't lose feature (e.g., if player gets a "Can't Lose" symbol, the player is guaranteed to win).
- Research (e.g., which games did well in market research, what demographics liked the game, etc.)
- Demographics.
- Social contacts/friends who liked the game.
- A visual picture/graphic of a character of a game, key scene, key graphic, short sample of a bonus round so a player could look at it and experience the best part of the game (e.g., can show title, links, pictures, demos, samples of a game for free.)
- Progressive jackpots (e.g., could display games that are contributing to the progressive jackpot, so that if a player wants to switch from one game to another, then the player may want to see which games are related to the wide area progressive (WAP) network; could show a live feed of the progressive meter on a game for the jurisdiction (e.g., geographic area/zip code that a player is in if accessing the game online), etc.
- Historical information about a game a player has played or that other's have played.
- Trends for players based on game history, demographics, etc.
- Promotions or eligibility for promotions.
- Promotion points (e.g., link into a social community service that uses promotion points.)

Although FIG. 1 describes some embodiments, the following sections describe many other features and embodiments.

Example Operating Environments

This section describes example operating environments and networks and presents structural aspects of some embodiments. More specifically, this section includes discussion about game options visualization system architectures and wagering game networks.

Example Game Options Visualization System Architecture

Figure 2:
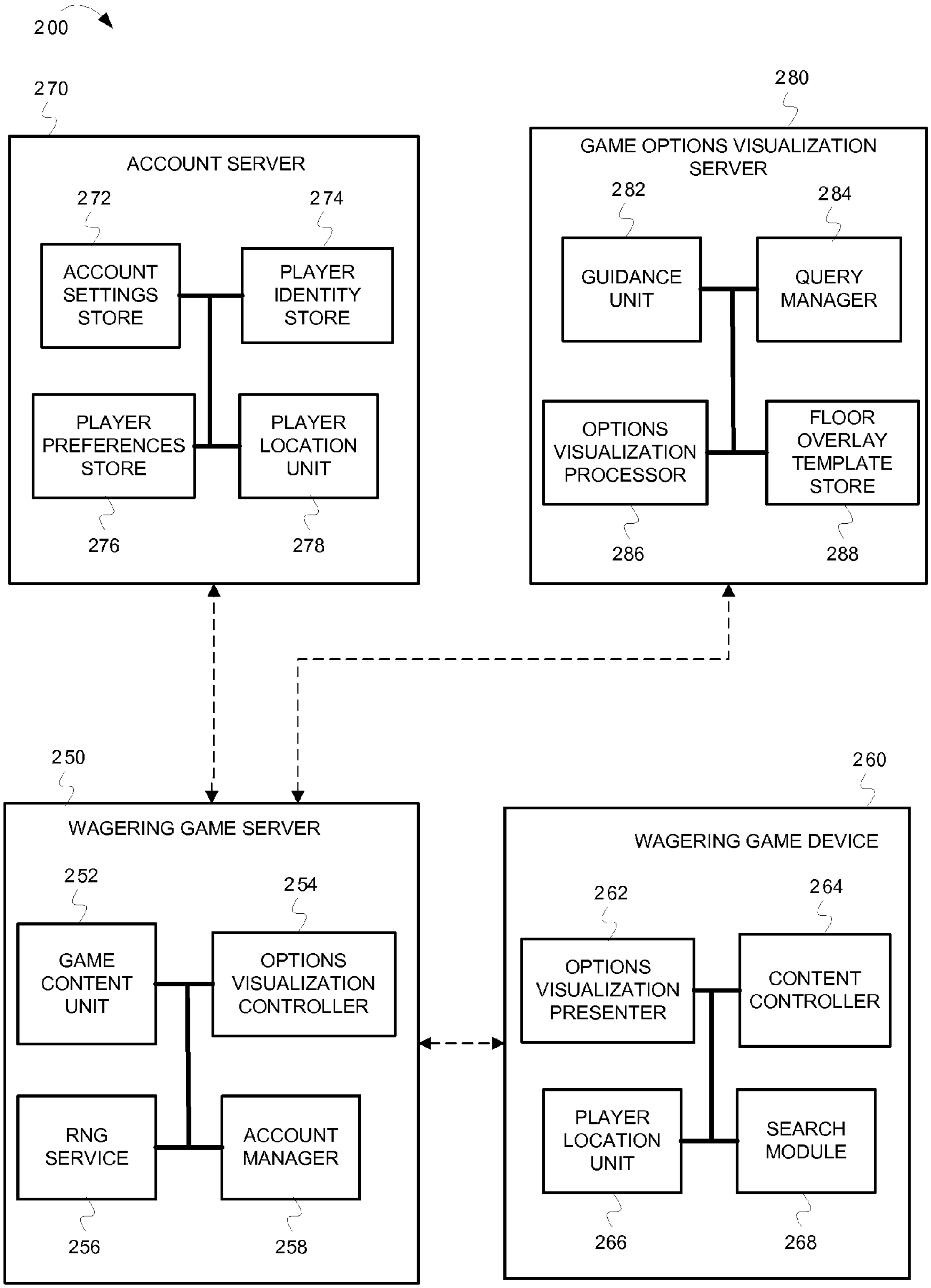
FIG. 2 is an illustration of a game options visualization system architecture 200, according to some embodiments.

FIG. 2 is a conceptual diagram that illustrates an example of a game options visualization system architecture 200, according to some embodiments. The game options visualization system architecture 200 can include an account server 270 configured to control user related accounts accessible via wagering game networks and social networks. The account server 270 can store and track player information, such as identifying information (e.g., avatars, screen name, account id numbers, etc.) or other information like financial account information, social contact information, etc. The account server 270 can contain accounts for social contacts referenced by the player account. The account server 270 can include an account settings store 272 configured to store information about settings for a player's account. The account server 270 also can include a player identity store 274 configured to store identifying information about a player's account. The account server 270 also can include a player preferences store 276 configured to store preferences information about a player's account. The account server 270 also can include a player location unit 278 configured to determine the geographic location of a device that a wagering game player has logged-in to.

The game options visualization system architecture 200 also includes a game options visualization server 280 configured to process and control information to visually present wagering game options. The game options visualization server 280 can include a guidance unit 282 configured to detect when a player requires guided assistance with wagering game options and to provide interactive, online guidance, such as via an avatar host. The game options visualization server 280 also can include a query manager 284 configured to prompt and process queries directed to a player to determine a player's preferences regarding wagering games. The game options visualization server 280 also can include an options visualization processor 286 configured to determine wagering game options for a player and to process information to present the wagering game options on a device in a wagering game network. The game options visualization server 280 also can include a floor overlay template store 288 configured to store one or more casino floor layout templates.

The game options visualization system architecture 200 also includes a wagering game server 250 configured to control wagering game content and communicate wagering game information, account information, and game options visualization information to and from a wagering game machine 260. The wagering game server 250 can include a game content unit 252 configured to contain content related to wagering games, and to present on the wagering game machine 260. The wagering game server 250 also can include an options visualization controller 254 configured to determine wagering game options for a player and to process information to visually present the wagering game options on the wagering game machine 260. The wagering game server 250 also can include a random number generation service 256 configured to generate random numbers for use with wagering games. The wagering game server 250 also can include an account manager 258 configured to control information related to player accounts.

The game options visualization system architecture 200 also includes a wagering game machine 260 configured to present wagering games and receive and transmit information to visually present wagering game options. The wagering game machine 260 can include an options visualization presenter 262 configured to present wagering game options within a visual selection environment on the wagering game machine 260. The wagering game machine 260 also can include a content controller 264 configured to manage and control content and presentation of content on the wagering game machine 260. The wagering game machine 260 also can include a player location unit 266 configured to determine the geographic location of a device that a wagering game player has logged-in to. The wagering game machine 260 also can include a search module 268 configured to process key words and search the wagering game network, including the account server 270, the game options visualization server 280, the wagering game server 250 and/or the wagering game machine 260 to obtain information related to wagering game options.

Each component shown in the game options visualization system architecture 200 is shown as a separate and distinct element. However, some functions performed by one component could be performed by other components (e.g., in some embodiments, the wagering game server 250 can perform the functions of the game options visualization server 280). Furthermore, the components shown may all be contained in one device, but some, or all, may be included in, or performed by multiple devices on systems and networks, as in the configurations shown in FIG. 2 or other configurations not shown. Furthermore, the game options visualization system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Wagering Game Network

Figure 3:
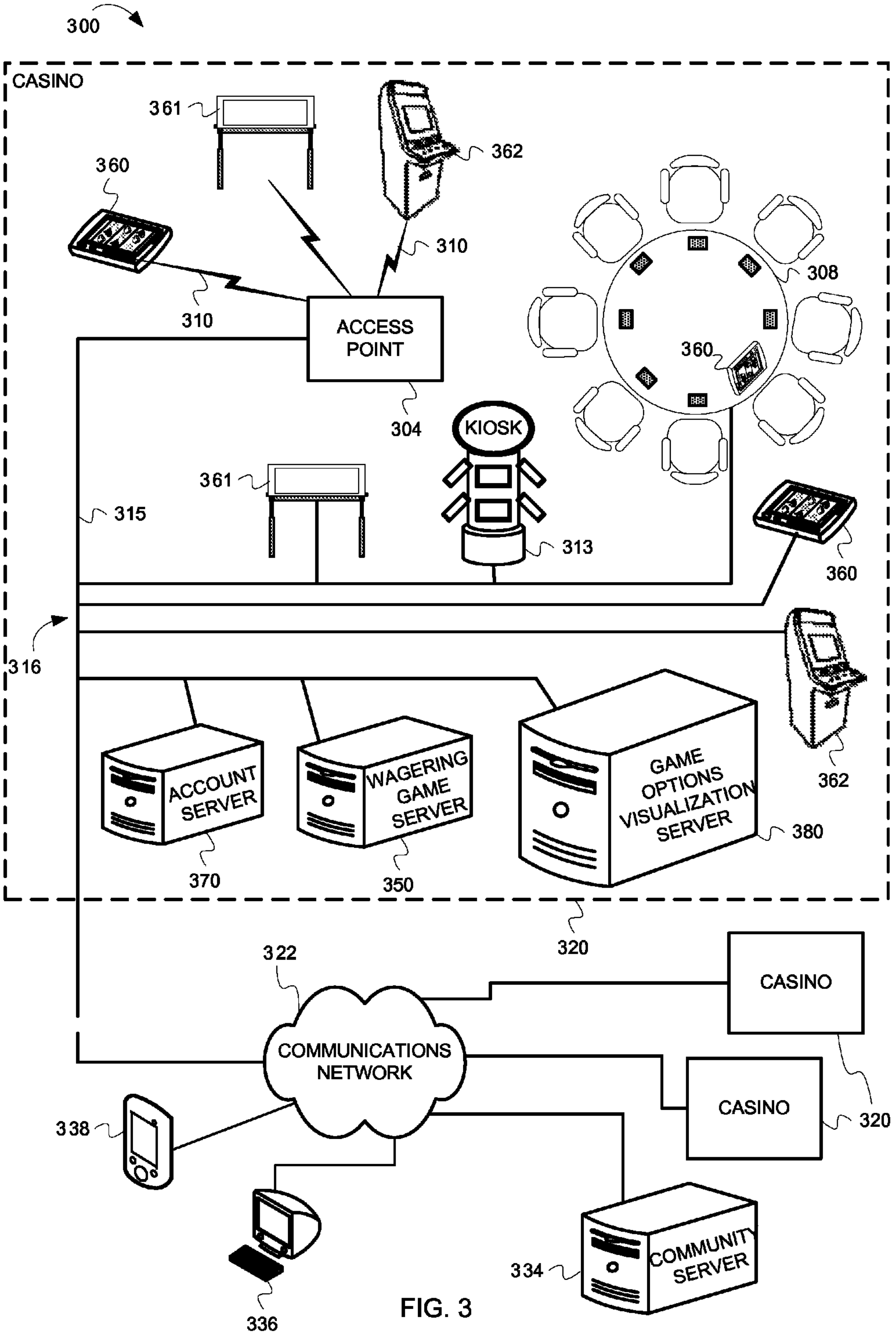
FIG. 3 is an illustration of a wagering game network 300, according to some embodiments.

FIG. 3 is a conceptual diagram that illustrates an example of a wagering game network 300, according to some embodiments. The wagering game network 300 includes example embodiments of the components described vis-à-vis FIG. 2. In FIG. 3, the wagering game network 300 includes a plurality of casinos 320 connected to a communications network 322. Each casino 320 includes a local area network 316, which includes an access point 304, one or more servers 350, 370, 380 and wagering game machines 360, 361, 362. In one embodiment, the local area network 316 may also include specific types of servers, such as wagering game servers, promotions servers, player information servers, management servers, social networking servers, progressive game servers, player tracking servers, file servers, web servers, application servers, database servers, and casino and player account servers. There are many other devices, in other embodiments, that are not shown but that may exist in a wagering game network (e.g., routers, switches, monitoring equipment, etc.). The access point 304 provides wireless communication links 310 with wagering game machines 360, 361, 362. The local area network 316 may also include wired communication links 315 to connect to servers 350, 370, 380, wireless access point 304, wagering game machines 360, 361, 362, one or more docking stations 308 and one or more kiosks 313 for storing mobile wagering game machines ("mobile machines"). The wired and wireless communication links can employ any suitable connection technology, such as Bluetooth, 801.11, Ethernet, public switched telephone networks, SONET, etc. In some embodiments, the servers 350, 370, 380, can serve wagering games and distribute content to devices located in other casinos 320 or at other locations on the communications network 322.

The wagering game machines 360, 361, 362 described herein can take any suitable form, such as floor standing models (e.g., 362), handheld mobile units (e.g., 360), bar-top models, workstation-type console models, surface computing machines (e.g., 361), etc. Further, the wagering game machines 360, 361, 362 can be primarily dedicated for use in conducting wagering games, or can include non-dedicated devices, such as mobile phones, personal digital assistants, personal computers, etc.

In some embodiments, the wagering game machines 360, 361, 362 and the wagering game server 350 work together such that wagering game machines 360, 361, 362 can be operated as a thin, thick, or intermediate client. For example, one or more elements of game play may be controlled by the wagering game machines 360, 361, 362 (client) or the wagering game server 350. Game play elements can include executable game code, lookup tables, configuration files, game outcome, audio or visual representations of the game, game assets or the like. In a thin-client example, the wagering game server 350 can perform functions such as determining game outcome or managing assets, while the wagering game machines 360, 361, 362 can present a graphical representation of such outcome or asset modification to the user (e.g., player). In a thick-client example, the wagering game machines 360, 361, 362 can determine game outcomes and communicate the outcomes to the wagering game server 350 for recording or managing a player's account.

In some embodiments, either the wagering game machines 360, 361, 362 (client) or the wagering game server 350 can provide functionality that is not directly related to game play. For example, account transactions and account rules may be managed centrally (e.g., by the wagering game server 350) or locally (e.g., by the wagering game machines 360, 361, 362). Other functionality not directly related to game play may include power management, presentation of advertising, software or firmware updates, system quality or security checks, community management, real-time messaging, etc.

The wagering game network 300 also includes a game options visualization server 380. The game options visualization server 380 can process and control information used to visually present wagering game options on the wagering game machines 360, 361, 362, on a personal computer 336, on a mobile device 338, or any other machine connected to the wagering game network 300 that is configured to present wagering game options. The game options visualization server 380 may be internal or external to a casino 320 and may interact with any suitable wagering game network component to visually present wagering game options. In some embodiments, some components of the game options visualization server 380 can reside inside any of the network components (e.g., wagering game server 350, account server 370, wagering game machines 360, 361, 362, etc.).

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 4:
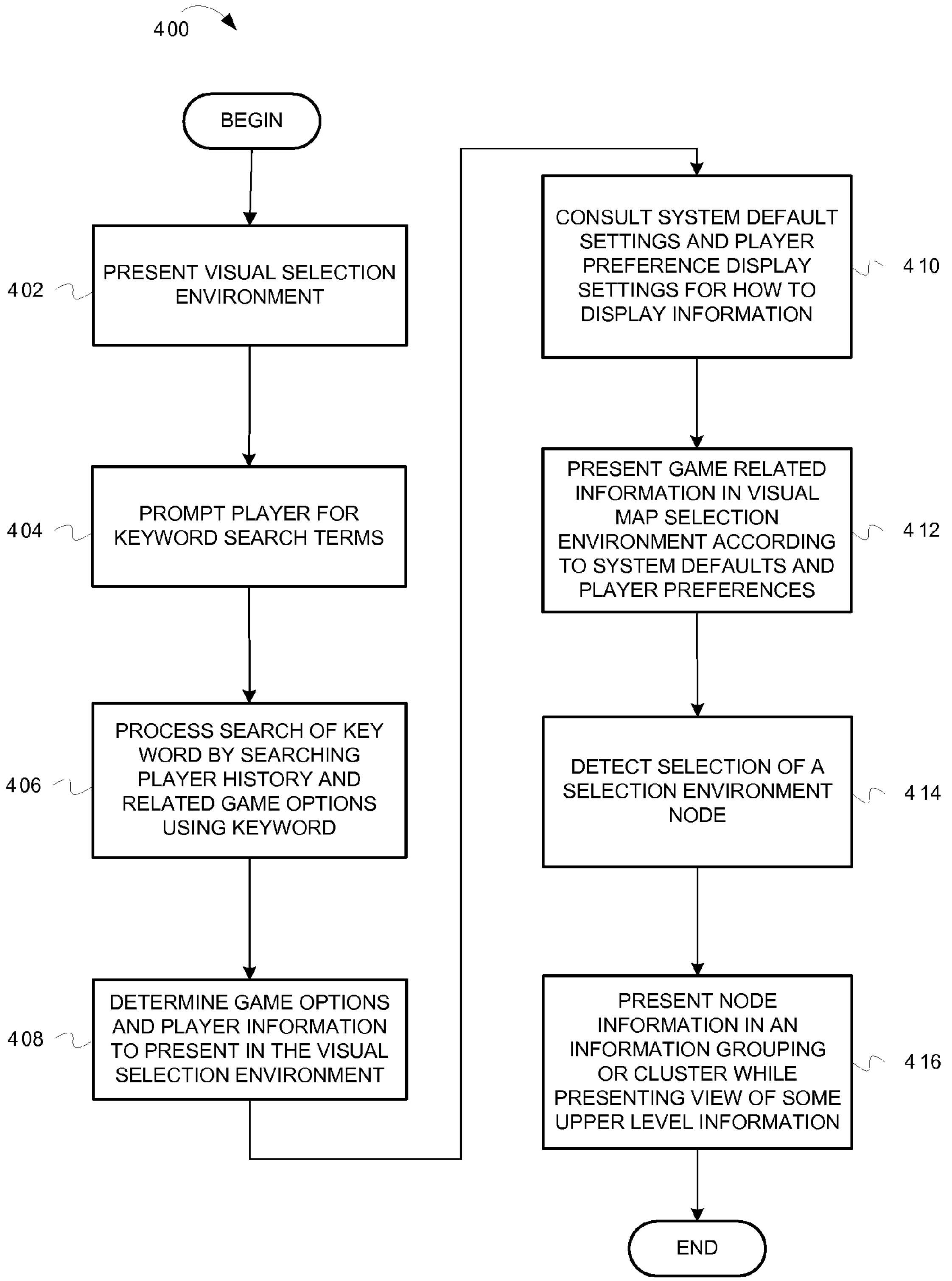
FIG. 4 is a flow diagram 400 illustrating visually presenting wagering game options in a visual map selection environment, according to some embodiments.
Figure 5:
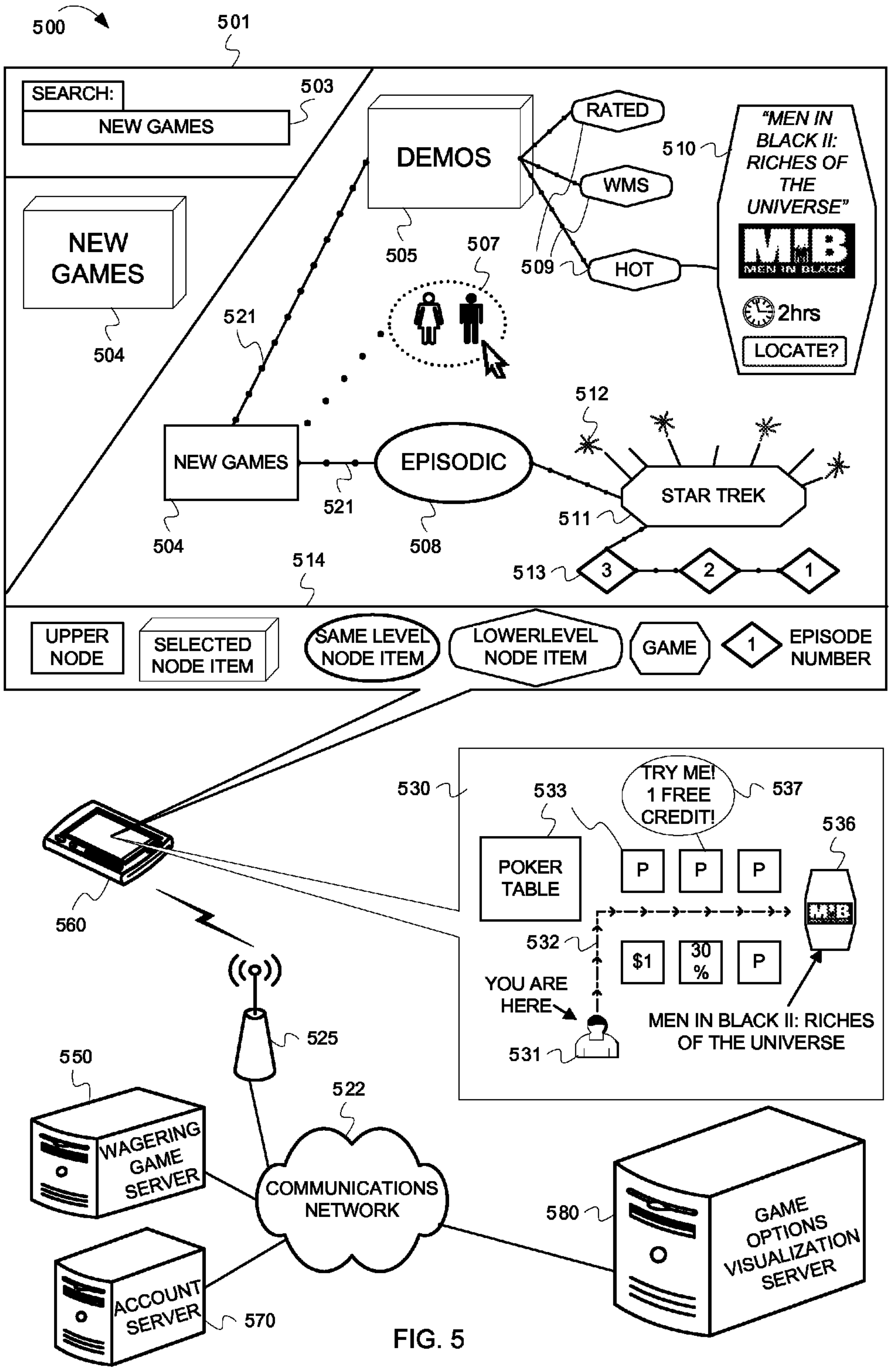
FIG. 5 is an illustration of a wagering game system 500, according to some embodiments.

FIG. 4 is a flow diagram illustrating visually presenting wagering game options in a visual map selection environment, according to some embodiments. FIG. 5 is a conceptual diagram that illustrates an example wagering game system 500, according to some embodiments. This description will present FIG. 4 in concert with FIG. 5. In FIG. 4, the flow 400 begins at processing block 402, where a wagering game options visualization system ("wagering game system") presents a visual selection environment 501 that includes a keyword search field 503 in which a player can enter one or more keywords (e.g., "new games"), or search terms, related to the player's preferences regarding wagering game options. Keywords can relate to potential wagering games that the player may have interest in playing. The search field 503 can accept multi-term queries, such as Boolean searches.

The flow 400 continues at processing block 404, where the game options visualization system prompts a player to enter search terms in the keyword search field 503.

The flow 400 continues at processing block 406, where the wagering game system identifies keyword(s) by inspecting a player's player history, related game options, other sources of wagering game information, etc. The keywords may appear in the player's history, for example, in the title of previous games that the player has played. The wagering game system can cross reference the keywords and extract additional search terms from the titles of recently played games. The wagering game system can then use the keywords and additional terms to search a new games database for games matching some of the keywords and terms (see discussion of block 408). In FIG. 5, the wagering game system 500 can identify the keywords and terms by searching one or more of the wagering game server 550, the account server 570, the game options visualization server 580, the wagering game machine 560, or other devices not shown (e.g. a database which may be part of or separate from any of the shown network devices.).

The flow 400 continues at processing block 408, where the wagering game system determines game options and player information to present in a visual selection environment. For example, the wagering game system searches a database of new games and finds a new game that matches some of the keywords and terms. The wagering game system can also search an account server and find information about friends, information about player preferences (e.g., likes, dislikes, etc.), and gather additional information that can be presented to help the player decide if a new game is worthy of the player's time and attention. For example, the wagering game system may search an account server and determine a list of the player's friends who also have wagering game accounts. The friends also have player histories, and one of those friends may have already played a new game and rated it highly. Consequently, the wagering game system may obtain player history information and ratings from friend accounts and decide to present that information to the player, along with the new game titles.

The flow 400 continues at processing block 410, where the game options visualization system consults system settings and player preferred display settings for how to display information. The wagering game system determines whether the player has listed any preferences for how to present game option information. The player has a player profile, perhaps stored in conjunction with the account server 570 in FIG. 5, that indicates what the visual selection environment should look like (e.g., like a visual map selection environment 501 shown in FIG. 5, a virtual universe selection environment 801 shown in FIG. 8, or other such environments). If the player has no preferences, then the wagering game system uses system default settings.

The flow 400 continues at processing block 412, where the game options visualization system presents game related information in the visual selection environment according to system defaults and player preferences. In FIG. 5, the wagering game system 500 presents game related information in the visual map selection environment 501 as one or more "nodes" and "clusters". The environment 501 includes a "root" node 504 that presents information related to the keywords and terms. The root node 504 can be a variety of shapes, colors, textures, etc. For example, in FIG. 5, the root node 504 is presented as a cube. Each side of the cube can have information on it related to the keywords and terms or other relevant information. The root node 504 is the originating node of the visual map selection environment 501 because it is the root of the keyword search.

The flow 400 continues at processing block 414, where the game options visualization system detects selection of a selection environment node. In FIG. 5, wagering game system 500 presents the root node 504 as a cube. The cube shape corresponds to a legend 514 that describes shapes, colors, textures, etc. of a node. In some embodiments, nodes become cube-shaped when selected by a player. Once selected, in some embodiments, the root node 504 may expand into additional nodes and clusters (e.g., nodes 505 and 508). A player may select a different node, like node 505. The newly selected node 505 can take on the shape of the cube according to the legend 514 and the root node 504 may take a rectangle shape, according to the legend 514, because it is no longer selected and is an upper level node.

The flow 400 continues at processing block 416, where the game options visualization system presents node information in an information grouping or cluster, while also presenting some upper level information. For example, in FIG. 5, when a player selects the root node 504, and the wagering game system 500 presents the additional nodes 505, 508. The additional nodes 505, 508 are sub-topics of the root node 504. In other words, the additional nodes 505, 508 contain information related to sub-topics of the root topic (e.g. sub-topics of "new games", such as new game "demos" or new "episodic" games). The additional nodes 505, 508, therefore, hold a subordinate relationship to the root node 504. The additional nodes 505, 508 will be referred to herein as "sub-topic" or "child" nodes. The sub-topic nodes form an information grouping, or cluster, associated with the root node 504. The clusters are displayed as nodes 505, 508 that extend from, and visually connect to, the root node 504. The sub-topic nodes 505, 508 are non-linear, or specifically, they extend from the root node 504 in more than one direction or dimension, such as radially, from the root node 504. The sub-topic nodes 505, 508 are illustrated as being to the right of the root node 504, but other configurations permit the sub-topics nodes to be to the right, the left, above, below, etc. The relationship between the root node 504 and the sub-topic nodes 505, 508 are visually presented using connectors 521. The sub-topic nodes 505, 508, are interactive in that the player can move the sub-topic nodes 505, 508, as well as the root node 504, around in the visual map selection environment 501. When the player moves the root node 504, the connectors 521 can also move, extend, bend, or in any other way change shape or position to maintain a connection to the sub-topic nodes 505, 508. Additionally, additional sub-topic nodes 509, 511, 513 can appear and extend from the sub-topic nodes 505, 508 as clusters similar to how the sub-topic nodes 505, 508 extend from the root node 504. For instance, the sub-topic nodes 509 can appear when a player selects the sub-topic node 505. Additionally, the wagering game system 500 can also present the root node 504, or upper level of information, at the same time that the wagering game system 500 presents the sub-topic nodes 505, 508, or lower level information. In FIG. 5, the wagering game system 500 presents multiple levels of information at the same time, such as an upper level of information, (i.e., the root node 504), a selected level of information (i.e., the node 505 and a same level node item 508), and a lower level of information (nodes 509 and 511). The wagering game system 500 can minimize the size of upper level information to make room on the wagering game machine 560 to present the selected level of information. Depending on the need, the wagering game system 500 can remove, hide, or dramatically minimize one or more levels of information while presenting other levels of information. In some embodiments, when a node is de-selected, the sub-topic nodes that extend from the selected node may disappear, or they may remain appearing until manually minimized or closed. The wagering game system 500 can have logic that determines configurations for presenting information nodes, connectors, clusters, levels, etc. in an arrangement that makes best use of display space. The wagering game system 500 can zoom in and out to reveal an entire visual map or only a portion of the visual map. The wagering game system 500 can scroll in all directions to enable the player to move the map as a whole. The wagering game system 500 can also permit a player to move, reposition, minimize, etc., every individual node or cluster.

In FIG. 5, the node 505 expands to present a game option node 510, which displays information about a potential wagering game that the player may wish to play. The game option node 510 can include various features and information that assist the player to decide whether to play the game. For example, the game option node 510 presents text and graphics that describe the wagering game, such as a wagering game title and logo. The game option node 510 can also present a game demonstration, such as a video clip, that demonstrates key elements of the game. The game option node 510 presents a clock that indicates how long the player could play the game given the player's account credits. The wagering game system 500 can access account credits from the account server 570. The game option node 510 can also present a feature that will locate the nearest available game console or wagering game machine that can provide access to the game, if the wagering game machine 560 cannot. Game option node 510 is only one example how to present wagering game information. Game option node 511 is another example. The game option node 511 includes special effects, like sparkle 512, sounds, lights, images, etc., that draw attention to the game option node 511. The wagering game system 500 may apply the special effects to the game option node 511 as part of a marketing plan. A manufacturer or marketer for the game can pay for a service to highlight or advertise the game option in ways that distinguish the game option node 511 more than other game options. The game associated with game option node 511 is an episodic game (i.e., a game that is released in episodes). Each episode is different and introduces different game play elements or features that other episodes did not have. A story line may connect the episodes. Within the visual map selection environment 501, the episode nodes are linked together in a specific order that draws attention to the most recent episode. For example, the episode node 513 is connected to the game option node 511 with a connector to indicate that the third episode is the most recent episode. Numbers on the episode nodes also indicate episode numbers, or other information, such as a summary or teaser for the episode. Episode nodes may be arranged in a horizontal fashion, not a cluster, to draw attention to their episodic relationship. Thus, the wagering game system 500 utilizes the position and orientation of connectors to indicate specific relationships between nodes and clusters.

The wagering game system 500 allows the search criteria from the original search field 503 to be modified and updated. For example, any one of the nodes can be filtered with additional search terms, linked together, cross-referenced, etc. One way of filtering a node or cross-referencing different nodes, is via a filter object 507. The filter object 507 is a drag-and-drop object that can be stretched from one node (e.g., root node 504) and dropped on another node (e.g., sub-topic node 505). For instance, the filter object 507 can provide the option to cross reference the root search terms "new games" with information about related social contacts. The wagering game player has account information on the account server 570 that lists social contacts. The filter object 507 provides an interface to the account information to select a social contact identifier (e.g., an avatar) for a specific social contact, then drop the social contact identifier onto a node, such as the sub-topic node 505. The drag-and-drop process can combine search terms for "new games", "demos", and information for the selected social contact. The result can produce a filtered search that shows filtered information for the node, for example, filtering the sub-topic node 505 to show only demos for new games that the social contact has played. Other filters can be applied in ways not shown, such as additional search fields, pop-ups, links, dropdowns, etc. that link together relationships and attributes of different search terms.

Figure 6:
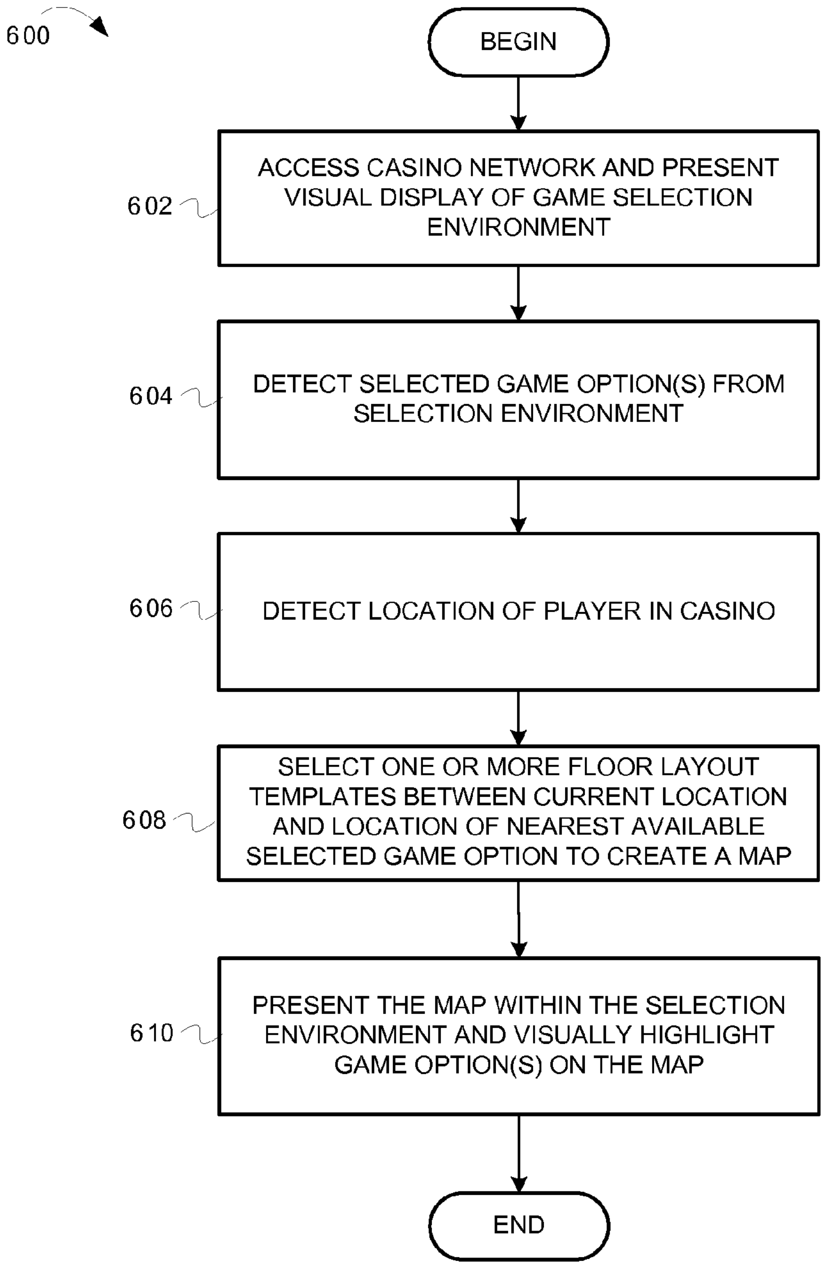
FIG. 6 is a flow diagram 600 illustrating visually presenting wagering game options on a visual map representing a casino floor layout, according to some embodiments.

FIG. 6 is a flow diagram illustrating visually presenting wagering game options on a floor map, according to some embodiments. This description will present FIG. 6 in concert with FIG. 5. In FIG. 6, the flow 600 begins at processing block 602, where a game options visualization system accesses a casino network and presents a visual display of a game selection environment. In FIG. 5, the wagering game system 500 enables a location feature of the game option node 510 that displays an available wagering game on a floor map of the casino. In some embodiments, the wagering game system 500 presents a visual display 530 of the casino floor on the wagering game machine 560. In some embodiments, the wagering game system 500 can present the visual display 530 on other devices, such as on an information kiosk, peripheral devices connected to the wagering game machine 560, or printed onto a physical map.

The flow 600 continues at processing block 604, where the game options visualization system detects selected game option(s) from selection environment. As shown in FIG. 5, the wagering game system 500 detects that a game option has been selected, such as by a player pressing a "locate" button on the game option node 510.

The flow 600 continues at processing block 606, where the game options visualization system detects location of a player in the casino. In FIG. 5, the wagering game system 500 detects the location of a player by detecting the location of the device that the player has logged-in to. For instance, the wagering game machine 560 includes a location unit that provides the exact floor coordinates of the machine. The wagering game machine 560 conveys the location information via the wireless access point 525 through the communications network 522, to a server (e.g., the game options visualization server 570) that can process the coordinates and provide control data that the wagering game machine 560 can use to indicate the player's location on the visual display 530. The wagering game machine 560 can indicate the player's location utilizing an icon, or avatar 531. In other embodiments, the wagering game system 500 may detect the location of other devices close to the game player, such as player detection devices, card detectors, etc., and use the location of the other devices to pin-point or track a player's location.

The flow 600 continues at processing block 608, where the game options visualization system selects one or more floor layout templates between current location and location of nearest available selected game option to create a map. The floor layouts are stored in a server, such as the game options visualization server 580 in FIG. 5. Floor layout templates can be digitized to show only outlines of items, such as a poker table or slot machines 533.

The flow 600 continues at processing block 610, where the game options visualization system presents the map within the selection environment and visually highlights one or more game options on the map. For example, the handheld mobile wagering game machine 560 presents step by step written, or audible, directions 532 to a highlighted game option 536. The wagering game system 500 highlights the wagering game option 536 using text (e.g., game titles, game descriptions, etc.), images (e.g., arrows, logos, moving icons, blinking lights, etc.), sounds, etc. The wagering game system 500 also presents suggestions, incentives, or advertisements for other games en-route to the highlighted game option 536. For example, the wagering game system 500 shows an advertisement 537 with a free credit to try a nearby game. The wagering game system 500 can show other information related to wagering games, such as which games are part of a progressive jackpot (e.g., marked with a "P"), win percentages for games (e.g., marked with a "30%"), costs of games (e.g., marked with a "$1"), etc.

In some embodiments, the wagering game system determines a location of where a digital copy, or content source, for a wagering game can be located on a wagering game network and accesses the copy of the wagering game over the network. For example, the wagering game system can find a wagering game on the casino network via the Internet and present the game to be played via the Internet. Hence, the wagering game system would not need to overlay casino floor templates, but rather may display a map of available servers from which wagering games can be downloaded.

Figure 7:
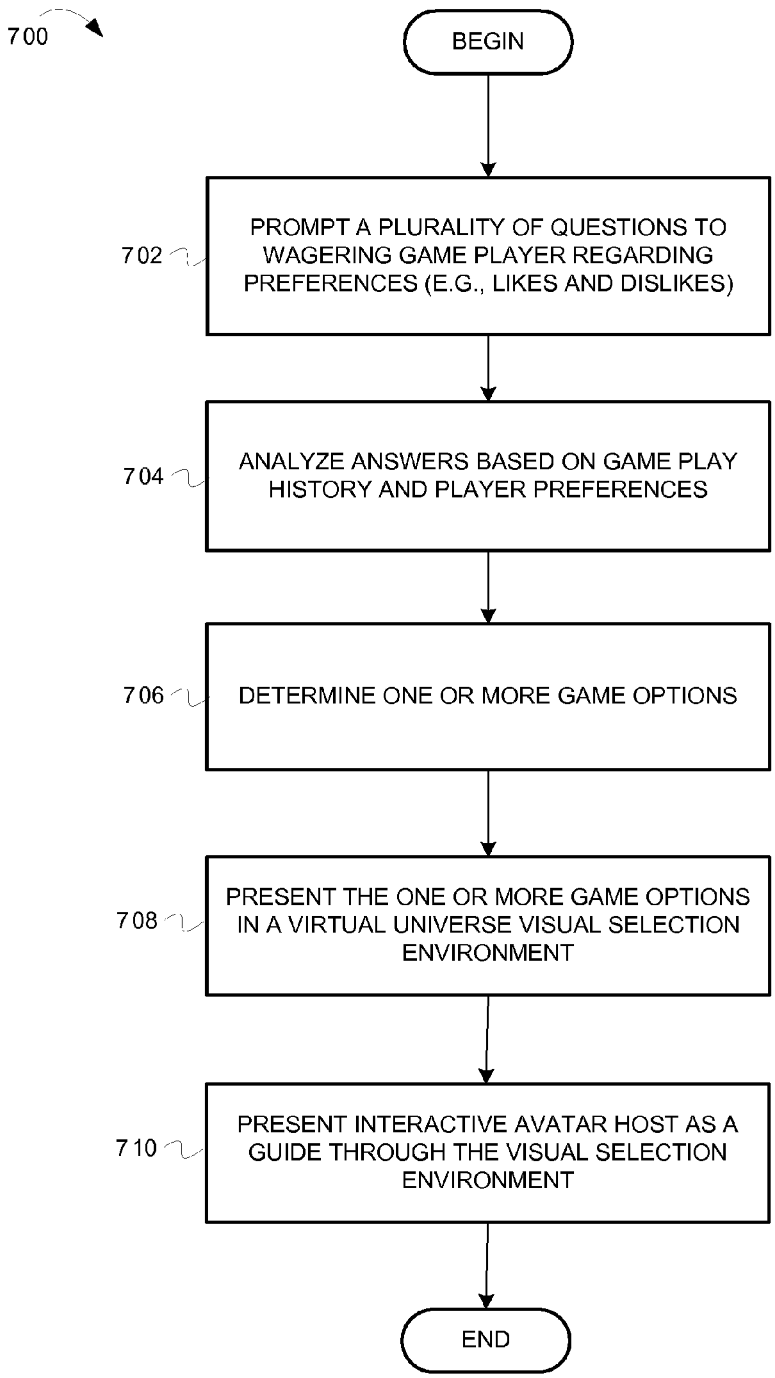
FIG. 7 is a flow diagram 700 illustrating visually presenting wagering game options in a virtual universe selection environment, according to some embodiments.
Figure 8:
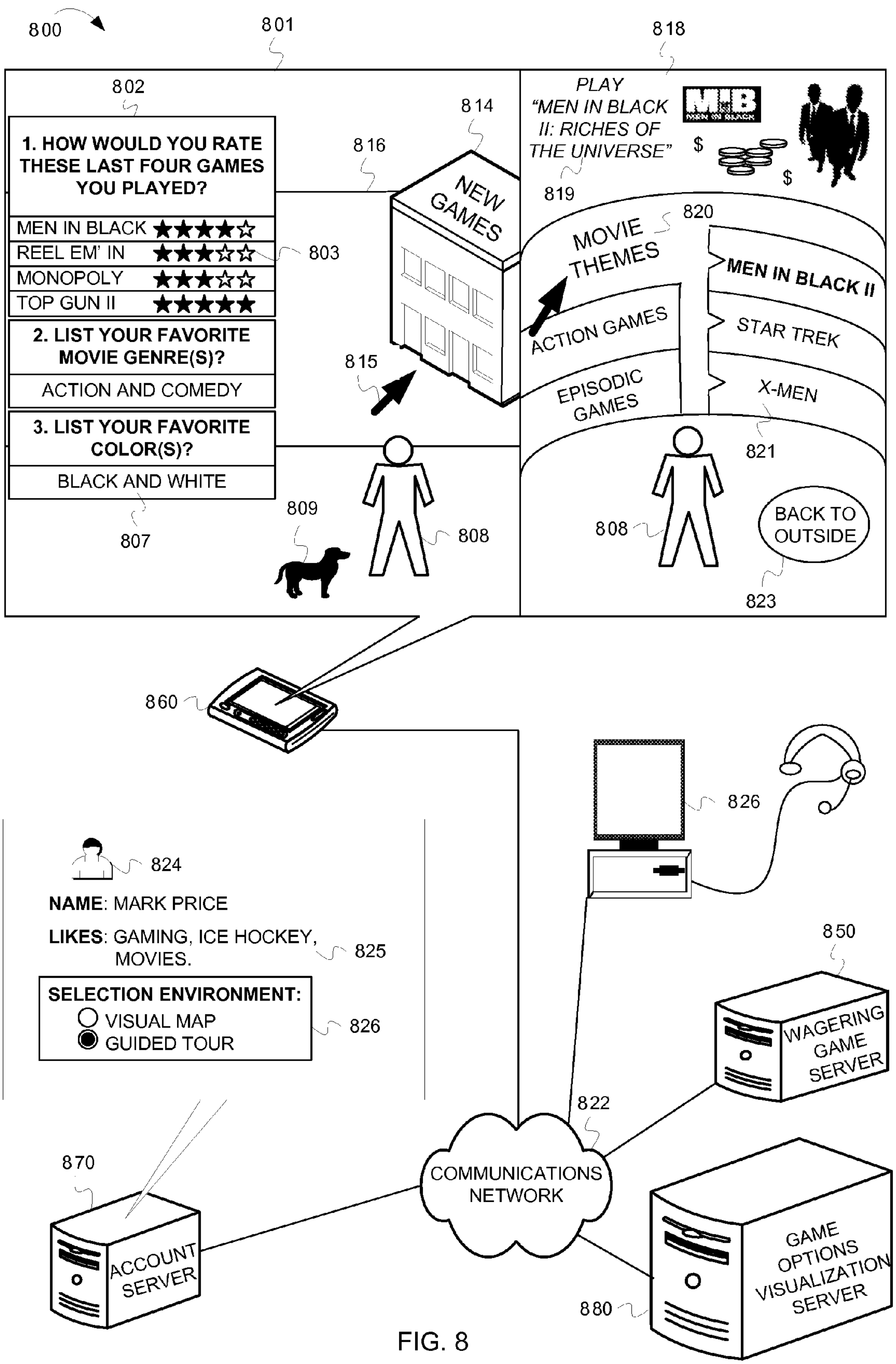
FIG. 8 is an illustration of a wagering game system 800, according to some embodiments.

FIG. 7 is a flow diagram illustrating visually presenting wagering game options in a virtual universe selection environment, according to some embodiments. FIG. 8 is a conceptual diagram that illustrates an example wagering game system 800, according to some embodiments. This description will present FIG. 7 in concert with FIG. 8. In FIG. 7, the flow 700 begins at processing block 702, where a game options visualization system prompts a plurality of questions to a wagering game player regarding preferences (e.g., likes, dislikes, etc.). In FIG. 8, a wagering game system 800 presents a virtual universe selection environment 801 on a wagering game machine 860. The wagering game machine 860 is connected to a communications network 822. A wagering game server 850, an account server 870, and a game options visualization server 880 are also connected to the communications network 822. The wagering game system 800 can access a player account from the account server 870 to capture player preferences 825 (e.g., likes, dislikes, etc.) from the player account. The wagering game system 800 can then use the player preferences to generate questions or to answer questions. In some embodiments, the wagering game system 800 presents an interview 802. The interview 802 includes various types of questions and response mechanisms, such as graphical input devices (e.g., rating stars 803) and text input fields 807.

The flow 700 continues at processing block 704, where the game options visualization system analyzes answers based on game play history and player preferences. The wagering game system 800 in FIG. 8, for example, parses the answers and searches the account server 870, the wagering game server 850, and other network devices for additional information (e.g., preferences, new game lists, player game history, friend's game history, etc.). The wagering game system 800 then analyzes the answers and additional information. For example, the wagering game system 800 compares the answers and other gathered information against a list of game options, such as a list of new games that had been recently released.

The flow 700 continues at processing block 706, where the game options visualization system determines one or more game options. The wagering game system 800, for example in FIG. 8, displays a building 814 in the virtual universe selection environment. The building 814 relates to search criteria that the player entered or that was determined through the series of questions posed by the wagering game system 800. The building 814 is presented as part of the virtual universe topology 816. The topology 816 represents a first level of information, as described previously in FIG. 1. The wagering game system 800 uses information obtained from the answers, the gathered information, etc., and determines a list of potential game options (e.g., new games), that the player may find interesting. The wagering game system then presents the game options inside of the virtual universe visual selection environment 801.

The flow 700 continues at processing block 708, where the game options visualization system presents the one or more game options in a virtual universe visual selection environment. The wagering game system 800 can read from a player account to determine preferences 826 for the selection environment (e.g., a player prefers a "guided tour" or virtual universe environment over a visual map environment). The wagering game system 800 presents the selection environment accordingly. The avatar 808, in FIG. 8, follows the arrow 815 into the building 814 to an inner room 818. The room 818 includes sub-topics 820 (e.g., "movie themes", "action games", "episodic games") of the root topic (e.g., "new games"). The sub-topics 820 can also include sub-topics 821 and so forth, as described previously in FIG. 1. The room 818 presents information pertaining to selected game options (e.g., Men in Black II is selected from the sub-topics 821 and a description 819 of the game appears on the wall of the room 818.) The room 818 represents a second level of information within the virtual universe. The wagering game system 800 displays a link 823 to visually connect the room 818 to the hierarchy of the virtual universe selection environment 801. The player can select the link 823 at any time to return back to the first information level that displays the topology 816, similar to the description in FIG. 1.

The flow 700 continues at processing block 710, where the game options visualization system presents an interactive avatar as a guide through the virtual universe selection environment. In FIG. 8, the avatar 808 can be controlled by an administrator or real-world host via a host computer 827. The real-world host can control the movement of the avatar 808 to offer help or guidance in the virtual universe (e.g., to resolve issues, answer questions, make suggestions, etc.). Alternatively, the avatar 808 could be controllable by the player, whereas an additional avatar 809 (e.g., the dog shaped avatar 809) guides the avatar 808. In some embodiments, the avatar 808 can be controlled entirely by a computer without player or administrator assistance. In some examples, however, the avatar 808 may not be a guide rather just a representation of a wagering game player within the virtual universe.

Additional Example Embodiments

According to some embodiments, a wagering game system can provide various example devices, operations, etc., to visually present wagering game options. The following non-exhaustive list enumerates some possible embodiments.

- A wagering game system that distinguishes between game types (e.g., can distinguish between in-casino games and online games).
- A wagering game system that allows a wagering game player to create their own visual maps to share with other players (e.g., a visual map could show "big hits" of games played).
- A wagering game system that shows alerts of when games appear on the floor, such as a visual or audio alert when a new game episode is released.
- A wagering game system with a diagnostic tool used for internal maintenance or regulation. For example, the tool can show (1) games with similar features so that if there is a problem with a game feature, then the system can show all games with that problematic feature, (2) games that payout excessively or improperly, etc.
- A wagering game system that uses avatars that (1) have been chosen by a wagering game player and stored in a player's persistent state, (2) are non-anthropomorphic (e.g., a dog avatar that "sniffs" out games), (3) avatars that have supernatural abilities (e.g., an avatar can fly over game options and "swoop down" to make selections), etc.
- A wagering game system that learns from responses to questions presented to a wagering game player to better narrow additional questions.
- A wagering game system that offers post-game recommendations to players during cash-out or other game events. The recommendations could be based on previous game choices or upon the current game choice (e.g., a player may have played "Men In Black" and therefore may also like "Men in Black II: Riches of the Universe".
- A wagering game system that connects a player to an actual concierge. The avatar's movements are patterned after the concierge's actual movements.
- A wagering game system that presents an avatar during chat sessions to assist wagering game players with suggestions for wagering games or to answer questions regarding wagering games.

In some embodiments, the wagering game system can offer games on-demand. Thus, players can enter search queries for particular games. In some embodiments, if a player searches for a game that is not available, the system can later notify the player when the game becomes available. That is, the system can remember what games players want, and notify them when those games are available. For example, a player searches for the "Jackpot Party" game, but it is not available on the wagering game system. Later, the player is searching for games and Jackpot Party is available for play. Even though the player has not again searched for Jackpot Party, the system can notify the player that Jackpot Party is available. In some embodiments, the system can notify the player by posting a message in the search interface. Alternately, the system can notify the player by sending a message (e.g., email, IM, etc.), by posting a link to the requested game in the player's profile, etc. In some embodiments, based on players' queries, the system can recommend games that the players will likely enjoy.

Additional Example Operating Environments

This section describes example operating environments, systems and networks, and presents structural aspects of some embodiments.

Example Wagering Game Machine Architecture

Figure 9:
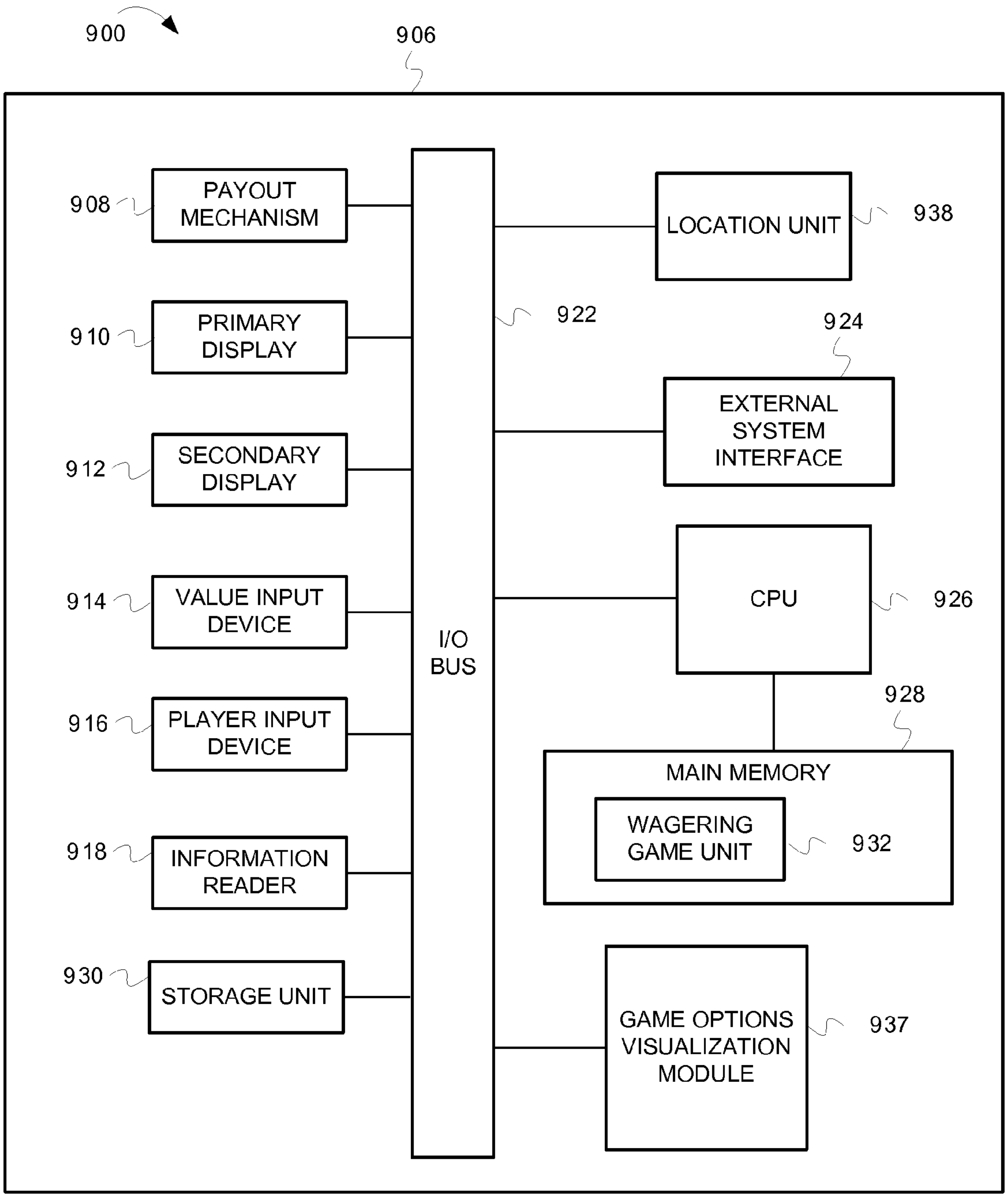
FIG. 9 is an illustration of a wagering game machine architecture 900, according to some embodiments.

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In one embodiment, the wagering game unit 932 can present wagering games, such as video poker, video black jack, video slots, video lottery, reel slots, etc., in whole or part.

The CPU 926 is also connected to an input/output ("I/O") bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In one embodiment, the wagering game machine 906 can include additional peripheral devices and/or more than one of each component shown in FIG. 9. For example, in one embodiment, the wagering game machine 906 can include multiple external system interfaces 924 and/or multiple CPUs 926. In one embodiment, any of the components can be integrated or subdivided.

In one embodiment, the wagering game machine 906 includes a game options visualization module 937. The game options visualization module 937 can process communications, commands, or other information, where the processing can visually present wagering game options, groupings, nodes, levels, etc. on the wagering game machine 906.

Furthermore, any component of the wagering game machine 906 can include hardware, firmware, and/or machine-readable media including instructions for performing the operations described herein.

Example Mobile Wagering Game Machine

Figure 10:
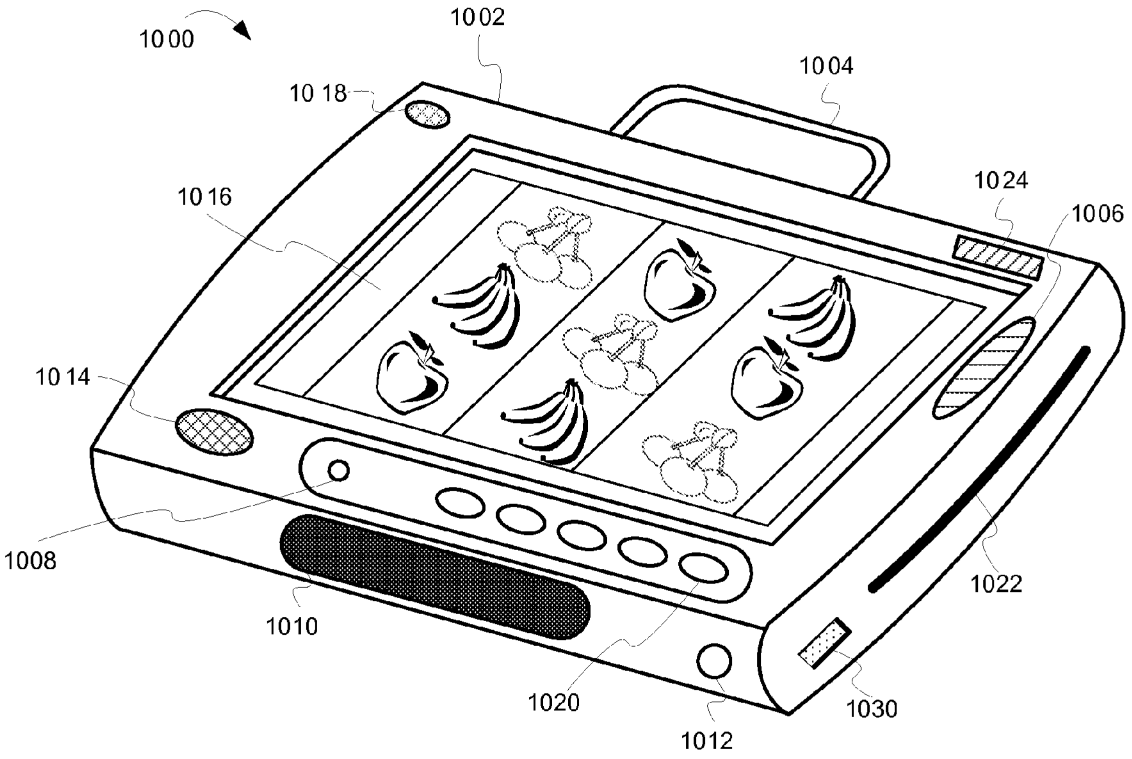
FIG. 10 is an illustration of a mobile wagering game machine 1000, according to some embodiments.

FIG. 10 is a conceptual diagram that illustrates an example of a mobile wagering game machine 1000, according to some embodiments. In FIG. 10, the mobile wagering game machine 1000 includes a housing 1002 for containing internal hardware and/or software such as that described above vis-à-vis FIG. 9. In one embodiment, the housing has a form factor similar to a tablet PC, while other embodiments have different form factors. For example, the mobile wagering game machine 1000 can exhibit smaller form factors, similar to those associated with personal digital assistants. In one embodiment, a handle 1004 is attached to the housing 1002. Additionally, the housing can store a foldout stand 1010, which can hold the mobile wagering game machine 1000 upright or semi-upright on a table or other flat surface.

The mobile wagering game machine 1000 includes several input/output devices. In particular, the mobile wagering game machine 1000 includes buttons 1020, audio jack 1008, speaker 1014, display 1016, biometric device 1006, wireless transmission devices 1012 and 1024, microphone 1018, and card reader 1022. Additionally, the mobile wagering game machine can include tilt, orientation, ambient light, or other environmental sensors.

In one embodiment, the mobile wagering game machine 1000 uses the biometric device 1006 for authenticating players, whereas it uses the display 1016 and speakers 1014 for presenting wagering game results and other information (e.g., credits, progressive jackpots, etc.). The mobile wagering game machine 1000 can also present audio through the audio jack 1008 or through a wireless link such as Bluetooth.

In one embodiment, the wireless communication unit 1012 can include infrared wireless communications technology for receiving wagering game content while docked in a wager gaming station. The wireless communication unit 1024 can include an 802.11G transceiver for connecting to and exchanging information with wireless access points. The wireless communication unit 1024 can include a Bluetooth transceiver for exchanging information with other Bluetooth enabled devices.

In one embodiment, the mobile wagering game machine 1000 is constructed from damage resistant materials, such as polymer plastics. Portions of the mobile wagering game machine 1000 can be constructed from non-porous plastics which exhibit antimicrobial qualities. Also, the mobile wagering game machine 1000 can be liquid resistant for easy cleaning and sanitization.

In some embodiments, the mobile wagering game machine 1000 can also include an input/output ("I/O") port 1030 for connecting directly to another device, such as to a peripheral device, a secondary mobile machine, etc. Furthermore, any component of the mobile wagering game machine 1000 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A system comprising:

a wagering game server comprising, an options visualization controller configured to receive search criteria and filter information for searching for wagering game titles, wherein the searching is based on the search criteria and filter information;

a game content unit configured to store the wagering game titles; and a wagering game machine configured to present the one or more wagering game titles in a visual map, the visual map comprising nodes that contain summary information associated with the wagering game titles, wherein the nodes are arranged in node groups, and wherein the node groups are graphically connected by graphical connectors;

present a movable filter object configured to visually depict a filter criteria, wherein the movable filter object is movable onto one or more of the nodes to provide the filter information to the wagering game server.

2. The system of claim 1, further comprising an options visualization presenter configured to display the summary information on the one or more of the nodes, determine that the movable filter object is moved onto the one or more of the nodes, determine one or more categories related to the one or more of the nodes, filter the search criteria for the one or more categories of the one or more of the nodes using the filter criteria, and replace the summary information with filtered summary information related to filtered search results for the one or more categories.

3. The system of claim 1, wherein the nodes are arranged in one or more hierarchical category levels, and further comprising an options visualization presenter configured to present the one or more hierarchical category levels such that a plurality of the hierarchical category levels are viewable on the visual map at the same time.

4. The system of claim 1, wherein the wagering game machine is further configured to detect selection of a node including one of the wagering game titles, and the wagering game machine further comprising:

an options visualization processor configured to determine a location where the one of the wagering game titles can be accessed in a casino; and a floor overlay template store configured to present a geographic map displaying the location.

5. The system of claim 1, further comprising:

an account server configured to access one or more preferences in a user account; and an account manager configured to use the one or more preferences to determine the one or more wagering game titles to present in the visual map.

6. The system of claim 1, wherein the wagering game machine is further configured to present one or more of video images, animations, and special effects in connection with the nodes.

* * * * *